United States Patent
Nakada et al.

(10) Patent No.: US 12,094,146 B2
(45) Date of Patent: Sep. 17, 2024

(54) CONTOUR ANALYSIS APPARATUS, PROCESSING CONDITION DETERMINATION SYSTEM, SHAPE ESTIMATION SYSTEM, SEMICONDUCTOR DEVICE MANUFACTURING SYSTEM, SEARCH APPARATUS, AND DATA STRUCTURE USED IN THEM

(71) Applicant: Hitachi High-Tech Corporation, Tokyo (JP)

(72) Inventors: Hyakka Nakada, Tokyo (JP); Takeshi Ohmori, Tokyo (JP); Naoto Takano, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 17/641,256

(22) PCT Filed: Feb. 10, 2021

(86) PCT No.: PCT/JP2021/004920
§ 371 (c)(1),
(2) Date: Mar. 8, 2022

(87) PCT Pub. No.: WO2022/172353
PCT Pub. Date: Aug. 18, 2022

(65) Prior Publication Data
US 2023/0377185 A1    Nov. 23, 2023

(51) Int. Cl.
*G06T 7/60* (2017.01)
*G06T 7/00* (2017.01)
(Continued)

(52) U.S. Cl.
CPC ............ *G06T 7/60* (2013.01); *G06T 7/001* (2013.01); *G06T 7/13* (2017.01); *G06T 17/00* (2013.01);
(Continued)

(58) Field of Classification Search
None
See application file for complete search history.

(56) References Cited

U.S. PATENT DOCUMENTS

2006/0288325 A1   12/2006   Miyamoto et al.
2009/0214103 A1   8/2009    Tanaka et al.
(Continued)

FOREIGN PATENT DOCUMENTS

JP    2006351746 A    12/2006
JP    2009198339 A    9/2009
(Continued)

OTHER PUBLICATIONS

Search Report mailed 11, 2021 in International Application No. PCT/JP2021/004920.
(Continued)

*Primary Examiner* — Frank S Chen
(74) *Attorney, Agent, or Firm* — Miles & Stockbridge, P.C.

(57) ABSTRACT

High-accuracy dimension extraction for a complicated shape possibly appearing through semiconductor processing. A starting point and an endpoint are placed on the periphery of a graphic shape including a combination of multiple ellipses, and a curve unicursally drawn on the periphery between the two points is used as a shape mode, thereby describing a contour of an intended structure.

13 Claims, 15 Drawing Sheets

(51) Int. Cl.
*G06T 7/13* (2017.01)
*G06T 17/00* (2006.01)

(52) U.S. Cl.
CPC ............... *G06T 2207/20081* (2013.01); *G06T 2207/30148* (2013.01)

(56) References Cited

U.S. PATENT DOCUMENTS

| | | | |
|---|---|---|---|
| 2014/0282290 A1* | 9/2014 | Rieger | G03F 1/70 |
| | | | 716/51 |
| 2018/0165388 A1 | 6/2018 | Liu et al. | |
| 2020/0074611 A1* | 3/2020 | Dou | G06T 7/74 |

FOREIGN PATENT DOCUMENTS

| | | |
|---|---|---|
| JP | 2012021839 A | 2/2012 |
| TW | 201830277 A | 8/2018 |
| WO | 2013047047 A1 | 4/2013 |

OTHER PUBLICATIONS

Office Action mailed Oct. 31, 2022 in Taiwanese Application No. 111104680.

* cited by examiner

| DATA NUMBER | SHAPE MODEL PARAMETER | | | VALUE OF DIMENSION TO BE EXTRACTED | | |
|---|---|---|---|---|---|---|
| | MAJOR AXIS LENGTH OF FIRST ELLIPSE (nm) | MINOR AXIS LENGTH OF FIRST ELLIPSE (nm) | ... | BOTTOM ECCENTRICITY | MAXIMUM WIDTH (nm) | ... |
| 1 | 36.2 | 10.9 | ... | 0.04 | 51.1 | ... |
| 2 | 34.2 | 10.1 | ... | 0.1 | 49.3 | ... |
| ⋮ | ⋮ | ⋮ | ⋮ | ⋮ | ⋮ | ⋮ |
| N | 35.4 | 11.3 | ... | 0.07 | 53.2 | ... |

CONTOUR ANALYSIS APPARATUS, PROCESSING CONDITION DETERMINATION SYSTEM, SHAPE ESTIMATION SYSTEM, SEMICONDUCTOR DEVICE MANUFACTURING SYSTEM, SEARCH APPARATUS, AND DATA STRUCTURE USED IN THEM

TECHNICAL FIELD

The present invention relates to a contour analysis apparatus, a processing condition determination system, a shape estimation system, a semiconductor device manufacturing system, a search apparatus, and a data structure used in them.

BACKGROUND ART

Desired semiconductor processing is performed by processing a semiconductor sample in a semiconductor process under proper processing conditions. In recent years, new materials have been introduced to form a device and device structure is increasingly complicated, thus having brought about expansion of the control range for the semiconductor processing apparatus and addition of many control parameters. The process has a larger number of steps to implement a microscopic and sophisticated process. For using a semiconductor processing apparatus to manufacture a high-performance device, there is a need to conduct the process development to derive proper processing conditions for realizing a target fabricated shape of a semiconductor sample.

For exploiting full performance of the semiconductor processing apparatus, optimization of a large number of control parameters is essential. To realize this, there are needs for know-how of the process development, high skills for operating the apparatus, and much trial and error in processing tests. Therefore, the process development requires a numerous number of times dimension measurements are made. For example, if a sample of L/S (Line and Space) patterns is considered to be processed, assuming that dimensions such as CD (Critical Dimension), depth or the like for each line pattern are measured in 10 places and the measured number of line patterns is ten, 100 measurements are required to be carried out for each sample. Therefore, if 100 samples are processed, 10000 times the dimension measurements are made is required in total.

The more complicated the device structure is, the larger the number of measurement places is. Thus, a challenge to overcome is a delay in process development associated with a larger amount of dimension measurement time. Further, the dimensions are increasingly reduced year by year with the finer structure, which increases the difficulty of manual extraction of dimensions. This requires technology to extract dimensions of an intended structure from an image of a semiconductor sample at high speeds and with high accuracy without manual extraction. PTL 1 discloses such technology.

In PTL 1, a shape model is used to generate a virtual fabricated shape and SEM simulation is used to create a database of fabricated shapes and SEM signal waveforms. An actual signal waveform obtained by SEM is collated in the database so that a fabricated shape close to the signal waveform is identified and estimated as a fabricated shape under observation. This enables contour detection (edge detection) of the SEM image and extraction of dimensions of the intended structure.

CITATION LIST

Patent Literature

PTL 1: Japanese Patent Application Laid-Open No. 2009-198339

SUMMARY OF INVENTION

Technical Problem

In the case of PTL 1, because of a simple shape model shown in an example embodiment, it is deemed that the recognition of a complicated shape is difficult. It is also deemed that the estimation of a shape not contained in the database is difficult because the estimation is done based on database verification. At present, for semiconductor devices, finer fabrications and 3D technologies are progressing and various structures such as quantum computers and the like are being suggested. In step with this, the manual extraction of dimensions is deemed to be increasingly more difficult in future. Because of this, there is a need to extract complicated and a variety of shapes in a short time without manual operation.

In terms of the problem of the difficulty of recognizing complicated and a variety of shapes, it is difficult to recognize, for example, a shape with different curvatures between at a side wall and a bottom in the line and space pattern. In typical etching, due to superimposed effects of both isotropic etching by radicals and ion-assisted anisotropic etching, the process result of such different curvatures can be often produced. Also, to avoid the problem of the difficulty of recognizing an unknown shape, using a very large-scale database possibly involves the difficulty of achieving estimation within realistic time frame.

Solution to Problem

A starting point and an endpoint are placed on the periphery of a graphic shape including a combination of multiple ellipses, and a curve unicursally drawn on the peripheries between the two points is used as a shape mode, thereby describing contours of an intended structure.

Advantageous Effects of Invention

High accurate dimension extraction is enabled for a complicated shape possibly produced in semiconductor processing.

Other problems and new features will be apparent from a reading of the following description of example embodiments and the accompanying drawings.

DESCRIPTION OF EMBODIMENTS

Figure 1:
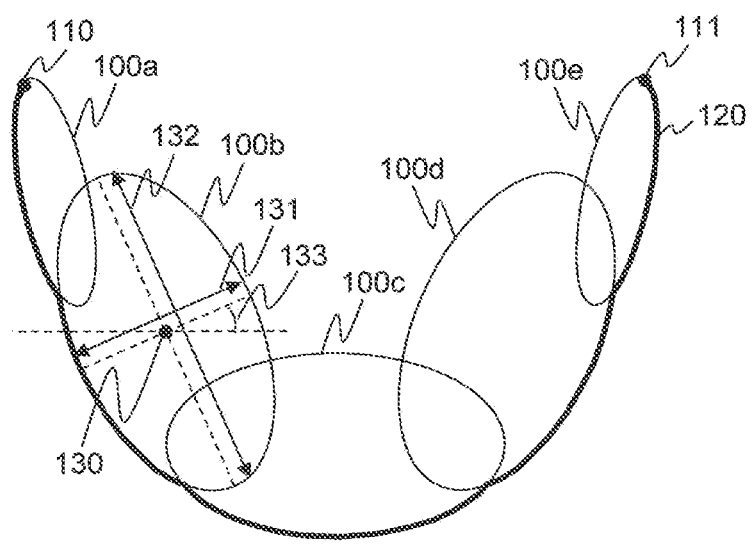
FIG. 1 is a shape model using multiple ellipses.

Embodiments according to the present invention will now be described with reference to the accompanying drawings. In this respect, the present invention should not be construed as being limited to details of the following embodiments. Those of ordinary skill in the art will readily understand that the specific configurations described herein can be changed without departing from the scope and sprit of the present invention.

Each of configurations described in the drawings and the like may not be depicted in actual position, size, shape, range, and/or the like to provide a better understanding of the present invention. Therefore, the present invention is not limited to the positions, sizes, shapes, ranges, and the like disclosed in the accompanying drawings and the like.

Example 1

Figure 4A:
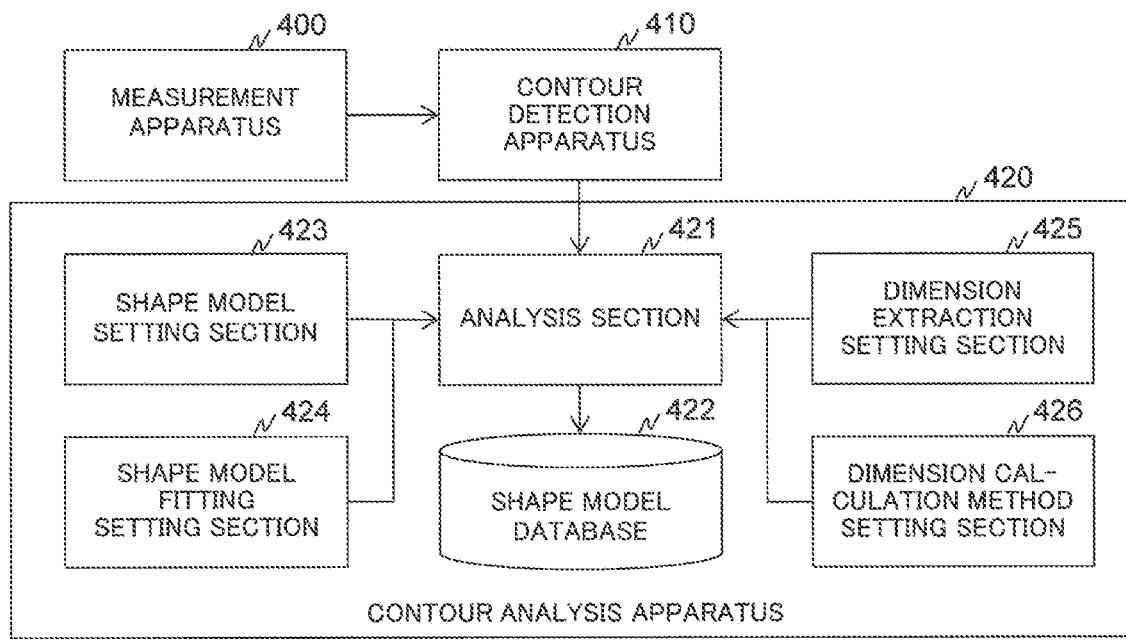
FIG. 4A is an example configuration of a dimension extraction system according to Example 1.

FIG. 1 and FIG. 4A are diagrams respectively illustrating a shape model and an example configuration of a dimension extraction system according to Example 1. The dimension extraction system according to Example 1 uses a shape model to extract dimensions desired by a user (dimensions of interest to be extracted) from an image, such as a SEM image and/or the like, acquired by a measurement apparatus.

Figure 2A:
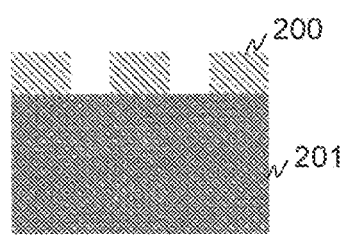
FIG. 2A is a sectional view of a masked pattern sample.
Figure 2B:
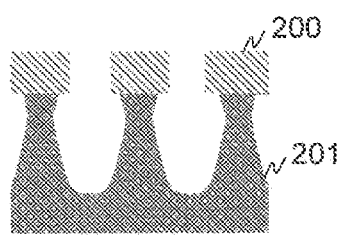
FIG. 2B is a sectional view of the masked pattern sample after etching.
Figure 3:
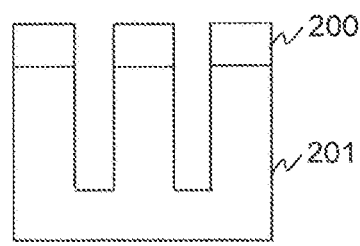
FIG. 3 illustrates an example virtual shape used in scatterometry.

FIG. 2A is a sectional view of a masked pattern sample as a typical example of a semiconductor sample. A mask 200 is formed on an etched film 201. FIG. 2B is a sectional view of the masked pattern sample on which etching has been performed. The etched film 201 is etched faster than the mask 200 in order to form a groove between mask patterns. If a target cross-sectional shape is a groove as shown in FIG. 3, a user has need to grasp a shape of an intended structure in FIG. 2B and adjust control parameters of a semiconductor processing apparatus. However, a fabricated shape formed without optimized control parameters of the semiconductor processing apparatus has a complicated shape. Because of this, as described earlier, the dimension measurement operation requires time and effort, and this is one of causes of delay in process development.

In Example 1, using a shape model using multiple ellipses as shown in FIG. 1 enables accurate description of a variety of and complicated shapes. An ellipse may describe from a straight line to a curve by changing a length of a major axis and/or a length of a minor axis, and a combination of multiple ellipses may describe a shape with different curvatures from one part to another. Further, instead of database collation as in PTL 1, the shape model is fitted by contour of the intended structure to estimate parameters for a shape model. If likely parameter values are obtained by fitting, substitution of them into the shape model provides a likely shape model accurately describing a contour of the intended structure. By using the likely shape model, various dimensions of the contour are analytically extracted.

In Example 1, as illustrated in FIG. 1, a starting point 110 and an endpoint 111 are placed on the periphery of a graphic shape including a combination of multiple ellipses 100a to 100e, and a curve unicursally drawn on the peripheries between the two points is defined as a shape model 120. Although FIG. 1 illustrates a line symmetric shape model resulting from a combination of five ellipses, the number of ellipses used may be any number of ellipses as long as two or more ellipses, and a line asymmetric model may be available.

Model parameters describing the shape model 120 will be hereinafter referred to as shape model parameters. The shape model parameters include first parameters, second parameters, and the like, the first parameters relating to arrangement and shapes of the ellipses such as center coordinates 130, a minor axis length 131, a major axis length 132, and a minor axis tilt 133 of each ellipse which are illustrated in an ellipse 100b in FIG. 1 by way of example, the second parameters relating to the manner of unicursal drawing (such as connecting the inner peripheries of the ellipses, connecting the outer peripheries of the ellipses, and/or the like). Such concrete examples of the first parameters illustrated in FIG. 1 are merely illustrative, and at least one or more of them may be included. For the ellipse 100, a flatness is adjusted by changing the balance between the minor axis length 131 and the major axis length 132. As a result, the shape model 120 may describe a complicated contour resulting from a combination of a near straight contour and a curvilinear contour. Also, the projections and depressions of the contour may be changed by changing the manner of unicursal drawing.

In this manner, the adjustment to the shape model parameters enables description of various shapes. It is noted that multiple ellipses are used and therefore the ellipses are properly numbered individually such as a first ellipse, a second ellipse, and the like and a shape model parameter for each ellipse is referred to as, for example, a major axis length of a first ellipse, a major axis length of a second ellipse, or the like.

A dimension extraction system using the shape model 120 will be described with reference to FIG. 4A. A measurement apparatus 400 is a measurement apparatus using a charged particle beam apparatus such as a scanning electron microscope and/or the like, and outputs information on an intended structure of a sample as image data. The measurement apparatus 400 is a measurement apparatus that utilizes a phenomenon, such as reflection, transmission, interference, or the like, occurring when electrons are launched into the sample, to acquire information on the sample as an image. Specifically, there are a scanning electron microscope, a transmission electron microscope, a scanning transmission electron microscope, and the like, which are measurement apparatus using an electron microscope. The image data acquired by the measurement apparatus 400 may be image data obtained by any of charged particle beam apparatus as descried above.

A contour detection apparatus 410 is an apparatus that detects an edge (contour) from the image received from the measurement apparatus 400. For example, from the input SEM (Scanning Electron Microscopy) image or TEM image, contour data is output. Methods to detect a contour include a detection method based on a change in pixel value such as Sobel, Canny, Laplacian, and the like, and a detection method using machine learning such as Open CV and the like, and a detection method using any of methods. It is noted that the contour detection apparatus 410 may be implemented as a function of a contour analysis apparatus 420 described below.

Figure 4B:
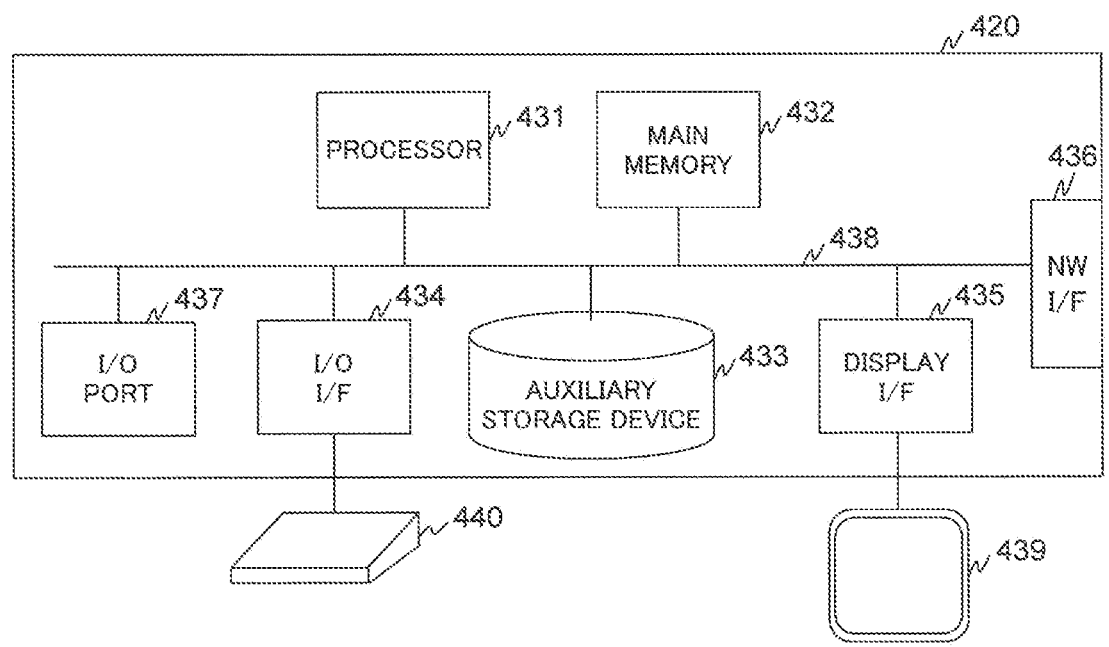
FIG. 4B is an example hardware configuration of a contour analysis apparatus.

FIG. 4B illustrates an example hardware configuration of the contour analysis apparatus 420. The contour analysis apparatus 420 includes a processor 431, main memory 432, an auxiliary storage device 433, an input/output interface 434, a display interface 435, a network interface 436, and an input/output (I/O) port 437, which are coupled via a bus 438 to each other. The input/output interface 434 is connected to an input device 440 such as a keyboard, a mouse, and/or the like, and the display interface 435 is connected to a display 439, which provide a GUI (Graphical User Interface). The network interface 436 is an interface for connection to external equipment through a network. The auxiliary storage device 433 typically includes nonvolatile memory such as HDD (Hard Disk Drive), SSD (Solid State Drive), flash memory, and/or the like, and stores a program executed by the contour analysis apparatus 420, data to be processed with the program, and the like. The main memory 432 includes RAM (Random Access Memory), and temporarily stores the program, data required to execute the program, and the like according to an instruction of the processor 431. The processor 431 loads and executes a program from the auxiliary storage device 433 into the main memory 432. When a program stored in the auxiliary storage device 433 is executed by the processor 431, a function of the contour analysis apparatus 420 is implemented in cooperation with another hardware for the given processing. A program executed by a computer and/or the like, the functionality thereof or means for implementing the functionality may be referred to as a "function", a "section", and the like. The contour analysis apparatus 420 may be implanted on a PC (Personal Computer), a server or Cloud.

The contour analysis apparatus 420 has an analysis section 421, a shape model database 422, a shape model setting section 423, a shape model fitting setting section 424, a dimension extraction setting section 425 and dimension calculation method setting section 426, and the contour analysis apparatus 420 is an apparatus that calculates a value of a shape model parameter which is a parameter of a shape model or a value of a user's dimension of interest to be extracted, from the contour data received from the contour detection apparatus 410. A shape model parameter and an extracted dimension calculated by the contour analysis apparatus 420 will be hereinafter referred to as a likely shape model parameter and a likely dimension, respectively.

The analysis section 421 performs analyses of the received contour data to fit the shape model, calculate a likely shape model parameter value, calculate a likely dimension value and/or the like. The resulting likely shape model parameter value and the resulting likely dimension value are stored in the shape model database 422.

The user sets specifications of a shape model (shape model specifications) through the shape model setting section 423, and sets a fitting method for the shape model through the shape model fitting setting section 424. Based on the above settings, the analysis section 421 uses the contour data received from the contour detection apparatus 410 to fit the shape model and calculate a likely shape model parameter value. A shape model obtained by substitution of the likely shape model parameter values is a likely shape model.

Further, the user sets a dimension of interest to be extracted through the dimension extraction setting section 425, and sets a method for calculating a value of the dimension of interest to be extracted through the dimension calculation method setting section 426. Based on the above settings, the analysis section 421 uses the likely shape model to calculate a likely dimension value for the dimension of interest to be extracted.

Figure 5:
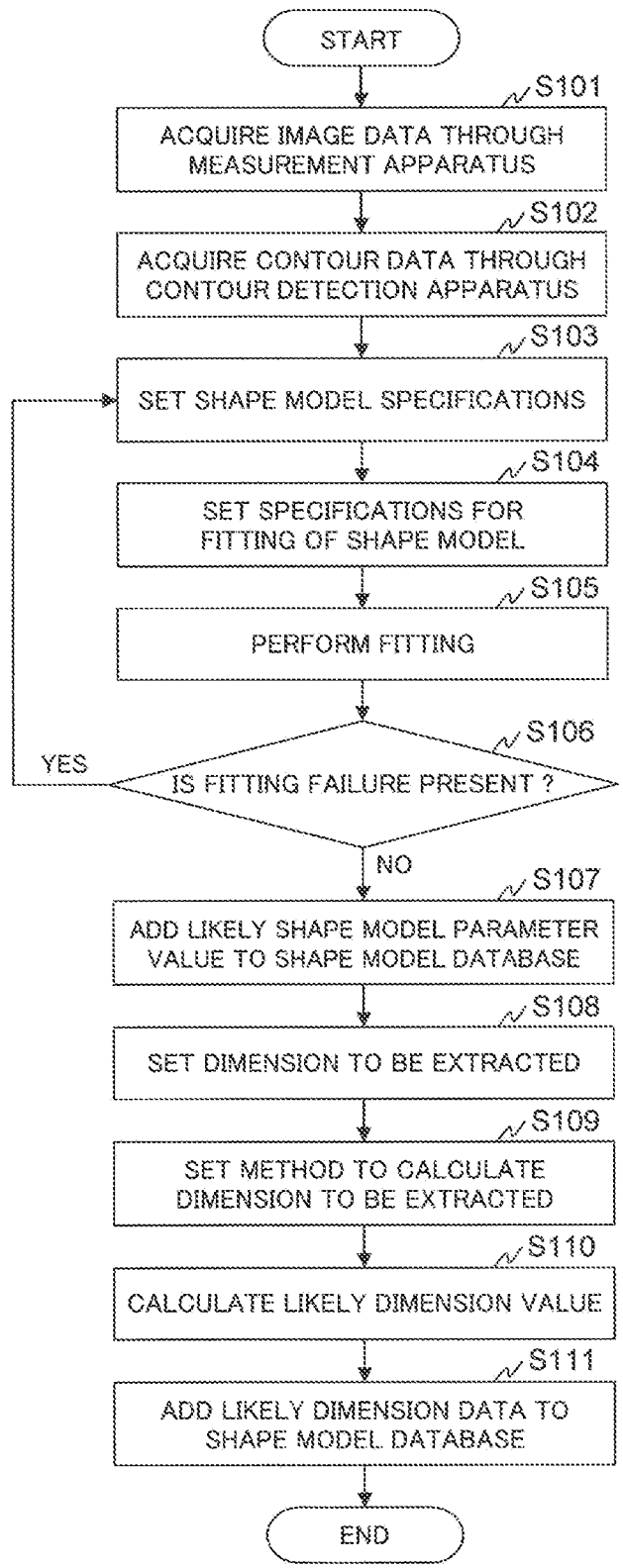
FIG. 5 is a flowchart of dimension extraction in Example 1.

FIG. 5 illustrates a flowchart for the dimension extraction system illustrated in FIG. 4A to extract a dimension from the image data acquired by the measurement apparatus 400 using the charged particle beam apparatus. A method to extract a dimension will be described below with reference to FIG. 5.

Figure 6A:
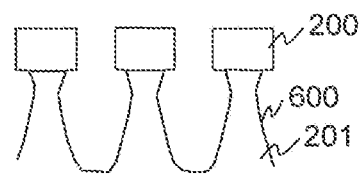
FIG. 6A illustrates contour data on the masked pattern sample illustrated in FIG. 2B.

First, the measurement apparatus 400 is used to acquire image data such as SEM images and/or the like (S101). Then, the contour detection apparatus 410 is used to acquire contour data from the image data (S102). As an example of the contour data, FIG. 6A illustrates contour data 600 representing a cross section of a masked pattern sample after etching. The etched film 201 is etched faster than the mask 200 to form a groove between mask patterns.

Shape model specifications are set through the shape model setting section 423 (S103). For example, a type of model such as "a line symmetric shape model composed of five ellipses" as illustrated in FIG. 1 may be specified and a type of shape model parameters describing a shape model may be specified.

Subsequently, a method to fit the shape model to the contour data is set through the shape model fitting setting section 424 (S104). For example, the least squares method, the weighted least squares method or the normalized least squares method may be used for fitting and nonlinear optimization approach using an iterative solution technique or combinatorial optimization approach may be used to estimate values of the shape model parameters. Also, settings are configured for end conditions of fitting and a method to generate random numbers or an initial value for use in the optimization process.

Figure 6B:
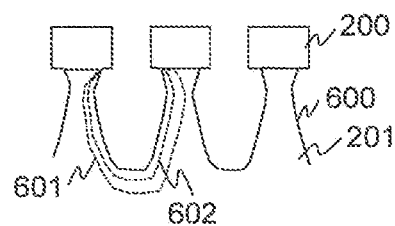
FIG. 6B is a diagram illustrating of the process of fitting a shape model to the contour in FIG. 6A.
Figure 6C:
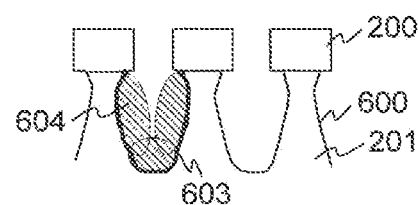
FIG. 6C is a diagram illustrating of the shape model fitted to the contour in FIG. 6A.

Based on the setting in steps S103, S104, the shape model is fitted to the contour data received from the contour detection apparatus 410 (S105). A state of fitting is described using FIG. 6B. A shape model 601 before fitting corresponds to a drawing of a shape model based on initial values of the shape model parameters. Using the contour data 600 to perform fitting provides an improvement in shape model parameter values to bring the shape model close to the contour 600 in a manner such as the shape model 602 during the fitting. Upon normal completion of the fitting, as illustrated in FIG. 6C, likely shape model parameter values with respect to the contour 600 are obtained and the likely shape model 603 becomes a model accurately reproducing the contour data 600.

Then, it is determined whether or not a failure related to the fitting is present (S106). If a failure is detected, the procedure returns to step S103 to perform reset of specifications of a shape model and reset for a fitting method for a shape model. In this connection, failures related to the fitting include: the fitting being not yet completed; the shape model parameter values taking local values during fitting; anomaly occurring in a shape of the likely shape model obtained by the fitting; and the like. Examples of shape anomalies include divergence between a shape visually recognized by the user viewing the image acquired by the measurement apparatus 400 and a shape of the likely shape model. If no failure is detected in step S106, the fitting is completed and the obtained likely shape parameter values are stored in the shape model database 422 (S107).

Figure 2C:
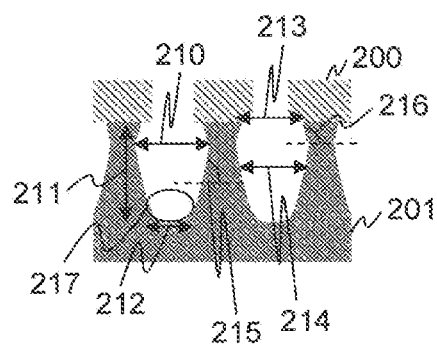
FIG. 2C is a diagram illustrating typical example shape features corresponding to the sectional view of FIG. 2B.

Then, a type of the user's dimensions of interest to be extracted is set through the dimension extraction setting section 425 (S108). The type of dimensions of interest to be extracted is set from a series of shape features as illustrated in FIG. 2C, by way of example. FIG. 2C illustrates examples of configurable shape features for the cross section of FIG. 2B. If machine learning is used in the process development, a correlation model Y=f(x) is obtained such as a regression where processing conditions are defined as an explanatory variable X, and the features related to fabricated shape (which are referred to as "shape features") are defined as an objective variable Y. And, the correlation model is used to estimate the processing conditions giving target shape features. It is noted that there are no quantitative guidelines about what to use as shape features of a semiconductor sample, and dimension data selected and extracted by the user is used. Regarding the groove shape in FIG. 2C, various types of shape features are conceivable such as a maximum width 210, a depth 211, a bottom width 212, a top width 213, a midway width 214, a taper angle 215, a bow angle 216, a bottom eccentricity 217, and the like.

Subsequently, a method to calculate a dimension of interest to be extracted is set through the dimension calculation method setting section 426 (S109). For example, a calculation method is considered for the maximum width 210, the depth 211, the bottom width 212, and the bottom eccentricity 217 of the shape features illustrated in FIG. 2C. Through the procedure until step S108, the contour data is acquired from the SEM image of the sample as illustrated in FIG. 2B and the likely shape model 603 as illustrated in FIG. 6C is obtained.

Figure 7:
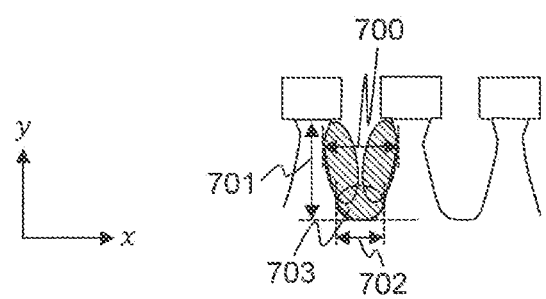
FIG. 7 is a diagram for illustrating how to use the shape model to calculate dimensions.

An example of methods to use the shape model 603 to calculate dimensions is described with reference to FIG. 7. In this example, the x axis of coordinate axes is along the boundary between the mask 200 and the etched film 201 and the y axis is oriented normal to the x axis. The bottom width 702 may be estimated from the major axis length of each ellipse 604. Because an eccentricity may be calculated from the major axis length and the minor axis length of each ellipse 604, the bottom eccentricity 703 can be estimated. The depth 701 is estimated from the center coordinates, the major axis length, the minor axis length and the minor axis tilt of each ellipse 604. Also, for each ellipse 604, as illustrated in FIG. 7, a plurality of coordinates where a differential value with respect to the y axis becomes zero are obtained and then a distance between x coordinates thus obtained is calculated in order to estimate the maximum width 700. In this manner, a value of a dimension of interest to be extracted is estimated by use of a singularity such as an extreme value point at which a differential value in the shape model 603 becomes zero, an indifferentiable point, an inflection point at which a differential value changes from positive to negative, and the like. Such a method to use a singularity of a shape model to calculate a dimension is referred to as a singularity search method.

The calculation method is not limited to the singularity search method. For example, a maximum width 700 may be obtained as a maximum value of the distance between x coordinates by extracting the x coordinates on the shape model 603 in certain increments along the y axis. Such a method to extract coordinates along a specific axis to calculate a dimension is referred to as a stripe search method.

Figures 8, 9:
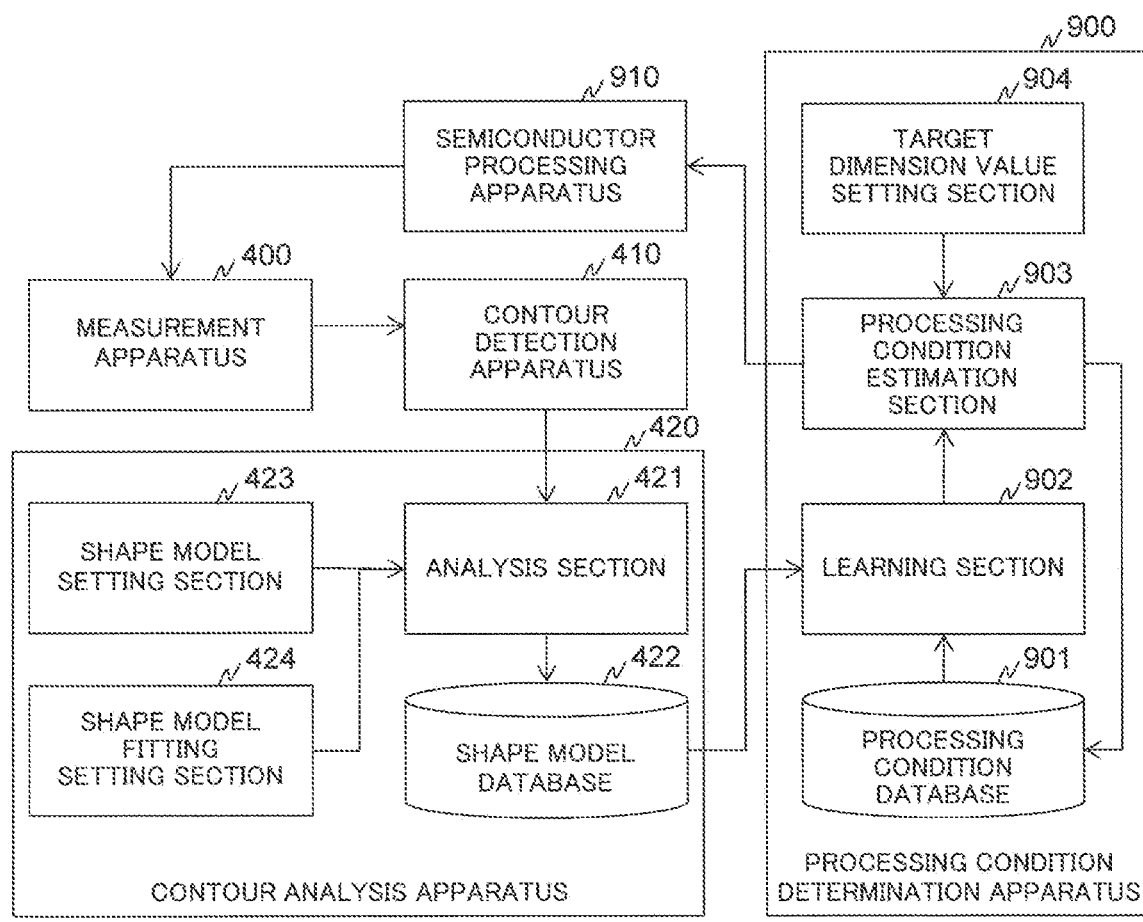
FIG. 8 illustrates an example of the data structure of a shape model database.
FIG. 9 is an example configuration of a processing condition determination system according to Example 2.

For the dimension of interest to be extracted which has been set in step S108, the calculation method set in step S109 is used to calculate, for example, a likely dimension such as the maximum width 700 (S110). The extracted likely dimension data is stored in the shape model database 422 (S111), and then the procedure is terminated. FIG. 8 illustrates an example data structure of the shape model database 422 obtained by applying the above-described procedure to the SEM images (corresponding to data numbers) of N samples.

Example 2

FIG. 9 is a diagram illustrating an example configuration of a processing condition determination system according to Example 2. In the processing condition determination system according to Example 2, appropriate processing conditions are determined for the semiconductor processing apparatus.

Example 2 is directed to faster process development using machine learning. As described above, in the process development using machine learning, typically, a correlation model with processing conditions defined as an explanatory variable X, and the shape features related to fabricated shape defined as an objective variable Y is used to perform a search for processing conditions giving target shape features. However, there are no quantitative guidelines about what to use as shape features, which will give rise to employment of redundant shape features as an objective variable and/or a loss of important shape features in describing a fabricated shape. In the former, a larger amount of experimental data for learning of correlation models is required in association with an increase in objective variables. This increases the number of times processing is performed by the semiconductor processing apparatus, which gives rise to concern that the process development period is prolonged. In the latter, lower expressiveness of a correlation model makes it difficult to predict the processing conditions providing a target fabricated shape, and similarly there is concern about a delay of the process development.

In Example 2, a shape model parameter appropriately describing a fabricated shape is defined as an objective variable of a correlation model in order to avoid the employment of redundant shape features and/or the loss of important shape features as described above. This enables faster process development.

Here, a measurement apparatus 400, a contour detection apparatus 410, a contour analysis apparatus 420, an analysis section 421, a shape model database 422, a shape model setting section 423, and a shape model fitting setting section 424 are identical in definition with those in Example 1.

A processing condition determination apparatus 900 has a processing condition database 901, a learning section 902, a processing condition estimation section 903, and a target dimension value setting section 904. The processing condition determination apparatus 900 is an apparatus that determines appropriate processing conditions based on data on likely shape model parameters within the shape model database 422 and the processing conditions within the processing condition database 901. The hardware configuration of the processing condition determination apparatus 900 is also similar to the contour analysis apparatus 420 shown in FIG. 4B, and a similar description is omitted.

The processing condition database 901 is a database that stores already acquired processing conditions and processing conditions estimated by the processing condition estimation section 903. The learning section 902 learns a correlation model between the likely shape model parameters within the shape model database 422 and the processing conditions within the processing condition database 901. The shape model parameter values desired by the user (target values) for the likely shape models are set in the target dimension value setting section 904. Alternatively, the shape model parameter values (target values) of the likely shape model may be calculated from the shape dimensions desired by the user. The processing condition estimation section 903 uses the correlation model acquired by the learning section 902 to estimate processing conditions giving the shape model parameter values set at the target dimension value setting section 904.

The semiconductor processing apparatus 910 is an apparatus to perform processing on a semiconductor sample, and performs sample processing using the processing conditions determined by the processing condition determination apparatus 900. The semiconductor processing apparatus 910 includes a lithography system, film deposition equipment, pattern processing equipment, ion implantation equipment, heating equipment, cleaning equipment, and the like, each of which is semiconductor manufacturing equipment. As the lithography system, exposure equipment, electron beam lithography equipment, X-ray lithography equipment, and the like are included. As the film deposition equipment, CVD (Chemical Vapor Deposition) equipment, PVD (Physical Vapor Deposition) equipment, vapor deposition equipment, sputtering equipment, thermal oxidation equipment, and the like are included. As the pattern processing equipment, wet etching equipment, dry etching equipment, electron beam processing equipment, laser processing equipment, and the like are included. As the ion implantation equipment, plasma doping equipment, ion beam doping equipment, and the like are included. As the heating equipment, resistance heating equipment, lamp heating equipment, laser heating equipment, and the like are included.

Figure 10:
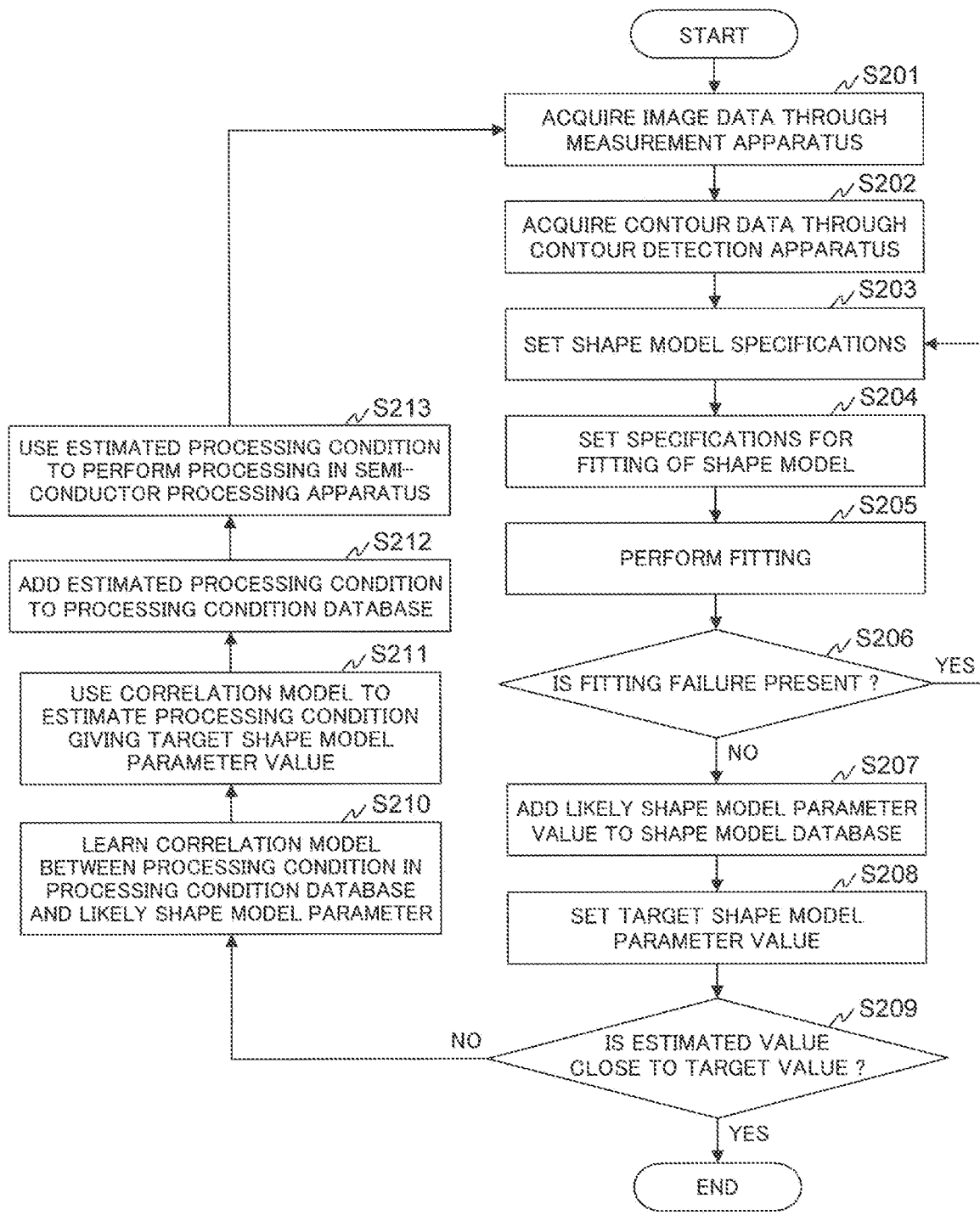
FIG. 10 is a flowchart for determining processing conditions of semiconductor processing apparatus in Example 2.

FIG. 10 is a flowchart for determining the processing conditions of the semiconductor processing apparatus by the processing condition determination system in FIG. 9. A method to determination the processing conditions at the semiconductor processing apparatus 910 will be described below with reference to FIG. 10.

The procedure steps S201 to S207 in FIG. 10 are identical with steps S101 to S107 in FIG. 5, respectively, and a description thereof is omitted.

After step S207 where the likely shape model parameters are stored into the shape model database 422, the target dimension value setting section 904 sets a target shape model parameter value of the user (S208). Then, it is determined whether or not the likely shape model parameter value estimated in step S207 is close to the shape model parameter value set at the target dimension value setting section 904 (S209). In this connection, a distance for evaluating the degree of closeness between values is calculated using any one of Euclidean distance, Manhattan distance, Chebyshev distance, and Mahalanobis distance. The determination whether or not the values are close is made based on whether the calculated value is larger or smaller than a reference value defined by the user.

At step S209, the procedure is terminated if the likely shape model parameter value estimated in step S207 is determined to be close to the shape model parameter value set at the target dimension value setting section 904. On the other hand, if it is determined in step S209 to be not close, the learning section 902 learns a correlation model between the processing conditions within the processing condition database 901 and the likely shape model parameters within the shape model database 422 (S210). In this connection, the correlation model represents a regression or classification model, and a model using a kernel method, a model using a neural network, a model using decision tree, and the like are used.

Then, the processing condition estimation section 903 uses the correlation model acquired at the learning section 902 to estimate processing conditions giving the shape model parameter value set at the target dimension value setting section 904 (S211). The estimated processing conditions are added to the processing condition database 901 to update the database (S212). The estimated processing conditions are used in the semiconductor processing apparatus 910 to perform processing on a new sample (S213). The sample after being subjected to the processing is taken from the semiconductor processing apparatus 910 and the procedure moves to step S201. The above-described series of procedure steps is repeated until termination is reached.

Then, GUI in accordance with Example 1 and Example 2 is described with reference to FIG. 11 and FIG. 12.

Figure 11:
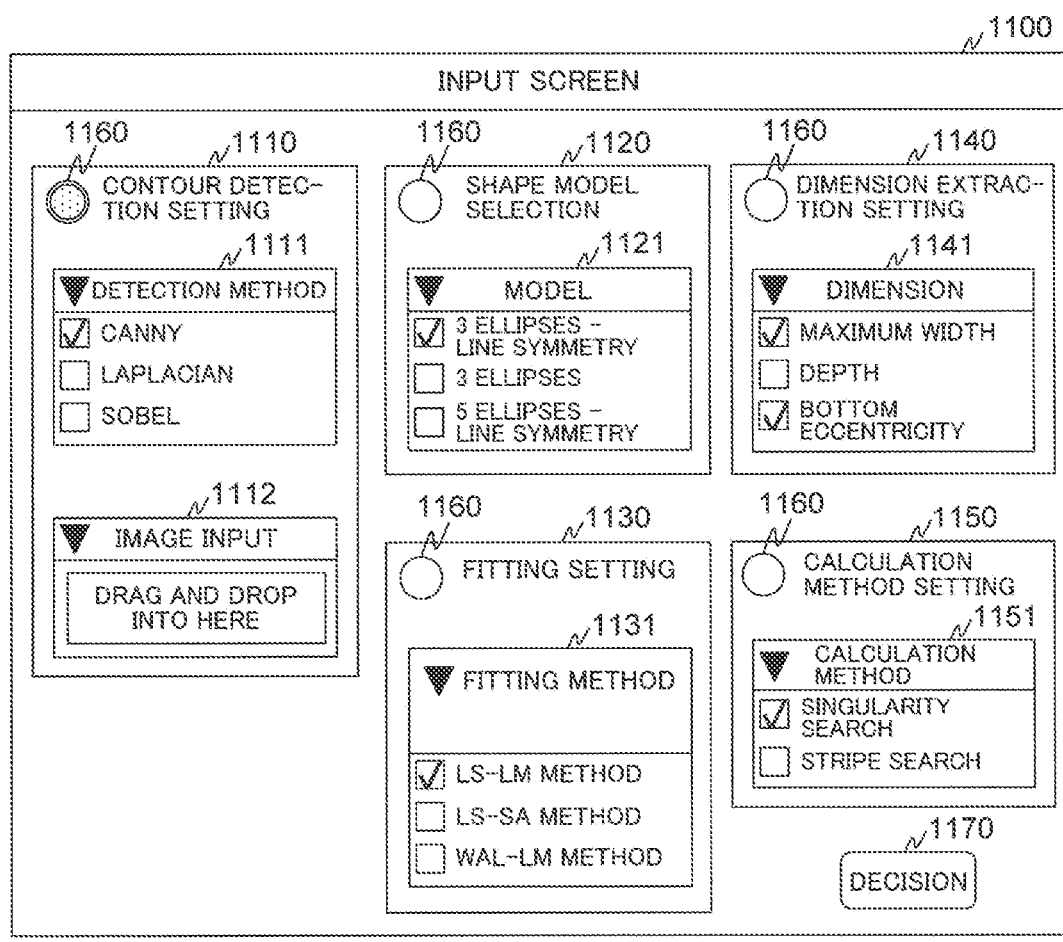
FIG. 11 illustrates an example of an input GUI.

An input GUI 1100 illustrated in FIG. 11 is an example input screen on which settings for the contour analysis apparatus 420 in Examples 1, 2 are input. The input screen is presented after the images are acquired through the procedure in step S101 in the case of Example 1 and through the procedure in step S201 in the case of Example 2.

The input GUI 1100 has a contour detection setting box 1110, a shape model selection box 1120, a fitting setting box 1130, a dimension extraction setting box 1140, a calculation method setting box 1150, an active/inactive display section 1160, and a decision button 1170. The contour detection setting box 1110, the shape model selection box 1120, the fitting setting box 1130, the dimension extraction setting box 1140, and the calculation method setting box 1150 perform respectively settings related to the contour detection apparatus 410, the shape model setting section 423, the shape model fitting setting section 424, the dimension extraction setting section 425, and the dimension calculation method setting section 426.

The contour detection setting box 1110 has a detection method input section 1111 and an image input section 1112. For example, in the detection method input section 1111, the method to detect a contour may be selected from between a detection method based on a change in pixel value such as Sobel, Canny, Laplacian, and the like, and a detection method using machine learning such as Open CV and the like. Also, the image data acquired in step S101 in the case of Example 1 and in step S201 in the case of Example 2 is dragged and dropped into the image input section 1112, thereby enabling the image data to be input to the contour detection apparatus 410.

The shape model selection box 1120 has a model input section 1121. For example, a line symmetric shape model composed of a specific number of ellipses, a shape model without line symmetry assumption, or the like is selected.

The fitting setting box 1130 has a fitting method input section 1131. Selection is made from, for example, among a method to optimize shape model parameters based on Levenberg-Marquardt using Least Squared method, a method to optimize shape model parameters based on Simulated Annealing method using Least Squared method, a method to optimize shape model parameters based on Levenberg-Marquardt using Weighted Least Squared method, and the like. Incidentally, in FIG. 11, the above methods are abbreviated to LS-LM method, LS SA method, WSL-LM method, respectively.

The dimension extraction setting box 1140 has a dimension input section 1141, through which the user sets a dimension/dimensions of interest to be extracted. The calculation method setting box 1150 has a calculation method input section 1151, through which a method to calculate the dimension of interest to be extracted which has been input through the dimension input section 1141 is set. For example, the singularity search method or the stripe search method, which have been described in Example 1, may be selected. It is noted that, in the case of Example 2, the input GUI 1100 is in no need of the dimension extraction setting box 1140 and the calculation method setting box 1150.

The active/inactive display section 1160 included in each of the abovementioned setting boxes is used to display whether or not the above-described input is effectively performed. When all active/inactive display sections 1160 become active, the decision button 1170 in the input GUI 1100 is pressed, thereby starting the procedure in step S102 in the case of Example 1 and the procedure in step S202 in the case of Example 2.

Figure 12:
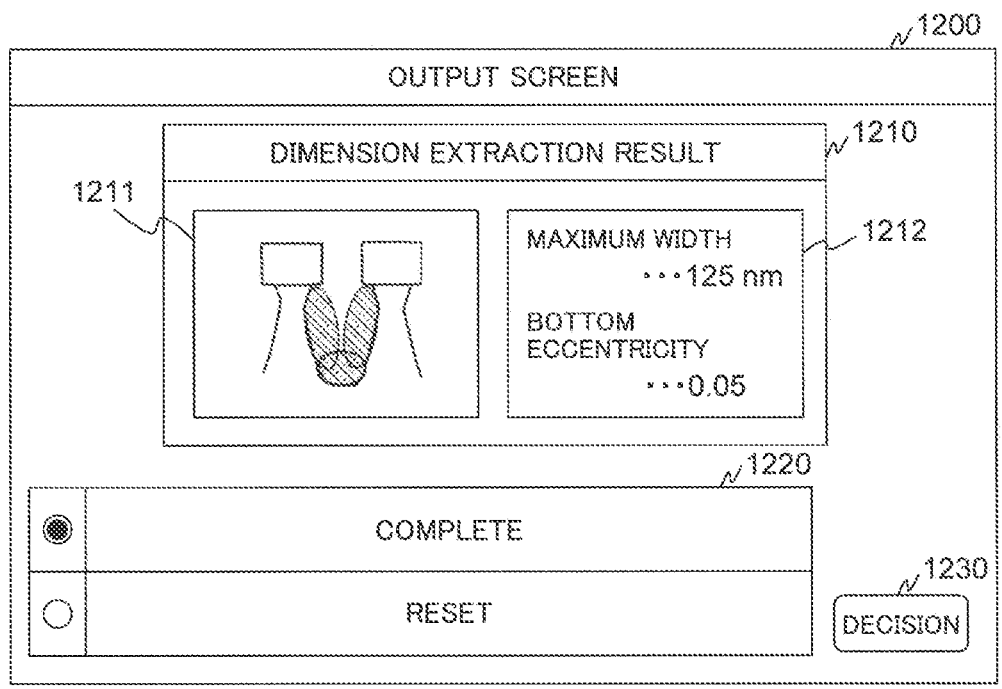
FIG. 12 illustrates an example of an output GUI.

FIG. 12 illustrates an output GUI 1200 presented in step S106 in the case of Example 1 and in step S206 in the case of Example 2 after the decision button 1170 in the input GUI 1100 is pressed to execute the procedure in FIG. 5 or FIG. 10. The GUI displays a current status to allow the user to select whether or not to move to the subsequent procedure. A dimension extraction result display section 1210 has a likely shape model display section 1211 and a dimension calculation result display section 1212. The likely shape model display section 1211 presents, to the user, a state of the shape model fitted at step S105 or S205. The dimension calculation result display section 1212 also presents, to the user, likely shape model parameter values and likely dimension values. Based on the shape model information displayed on the dimension extraction result display section 1210, the user may select between complete and reset in a complete/reset selection section 1220. If the user determines that no failure occurs in the fitting, the user selects the complete and presses a decision button 1230 in order to move to the procedure in step S107 in the case of Example 1 and in step S207 in the case of Example 2. If determining that a failure is present, the user selects the reset and presses the decision button 1230 in order to return back to the screen of the input GUI 1100, thereby enabling the reset.

Example 3

Figure 13:
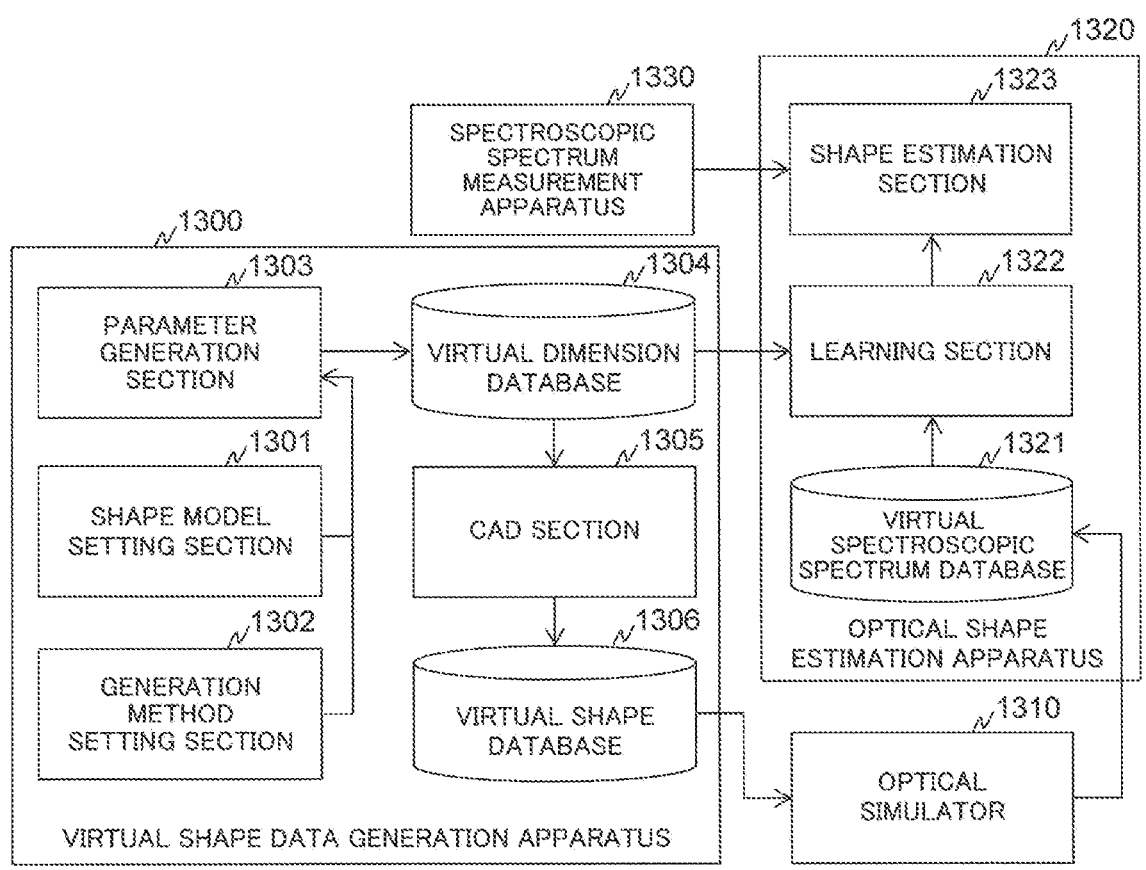
FIG. 13 is an example configuration of a structural shape estimation system according to Example 3.

FIG. 13 is a diagram illustrating an example configuration of a structural shape estimation system according to Example 3. In the structural shape estimation system according to Example 3, a shape of intended structure of a sample is estimated from a spectroscopic spectrum.

In Example 3, a shape model using multiple ellipses is used to provide enhanced accuracy of optical shape measurement such as Scatterometry and the like. In Scatterometry, optical simulation such as RCWA (Rigorous Coupled Wave Analysis) or the like is performed on CAD (Computer-Aided Design) data which is a virtually produced shape model, in order to produce a virtual spectroscopic spectrum data. A correlation model between the CAD data, which is the obtained virtual shape model, and the virtual spectroscopic spectrum data is obtained. The correlation model is used to estimate CAD data on a virtual shape model giving a virtual spectroscopic spectrum data closest to a spectroscopic spectrum actually determined by a spectrometer. Thereby, shape estimation is done from the spectroscopic spectrum determined by the spectrometer. Conventionally, a virtual shape is a simple shape composed of a combination of rectangles or the like as illustrated in FIG. 3. This presents a challenge that the estimation accuracy of a shape with curvature is low. In this example, using a shape model using multiple ellipses enables producing a complicated shape with curvature differing from part to part, and therefore an increase in accuracy of shape estimation is achieved.

A virtual shape data generation apparatus 1300 has a shape model setting section 1301, a generation method setting section 1302, a parameter generation section 1303, a virtual dimension database 1304, a CAD section 1305, and a virtual shape database 1306, and is an apparatus to generate virtual shape data.

The user sets shape model specifications through the shape model setting section 1301, and sets a method to generate a set/sets of shape model parameter values through the generation method setting section 1302. Based on the above settings, the set/sets of shape model parameter values generated by the parameter generation section 1303 is stored in the virtual dimension database 1304. The CAD section 1305 outputs, as CAD data, a shape obtained by substituting the shape model parameter values within the virtual dimension database 1304 into a shape model. The output CAD data is stored in the virtual shape database 1306.

An optical simulator 1310 is a simulator that performs optical simulation such as RCWA or the like on the CAD data (virtual shape model) within the virtual shape database 1306. In particular, for the geometric structure described by the CAD data, the simulator is configured to be able to calculate a theoretical value of the spectroscopic spectrum obtained by Scatterometry. The theoretical value of the spectroscopic spectrum is hereinafter referred to as a virtual spectroscopic spectrum.

A spectroscopic spectrum measurement apparatus 1330 is an apparatus that acquires a spectroscopic spectrum from light, such as scattered light, reflected light, interfering light, and the like which comes from the intended structure of the semiconductor sample.

An optical shape estimation apparatus 1320 is an apparatus to estimate a shape of the intended structure of the semiconductor sample from the measured spectroscopic spectrum, and has a virtual spectroscopic spectrum database 1321, a learning section 1322, and a shape estimation section 1323. The virtual spectroscopic spectrum database 1321 is a database that stores the virtual spectroscopic spectrum calculated at the optical simulator 1310. The learning section 1322 learns a correlation model between the shape model parameter value within the virtual dimension database 1304 and the virtual spectroscopic spectrum within the virtual spectroscopic spectrum database 1321. The shape estimation section 1323 uses the correlation model obtained at the learning section 1322 to estimate a shape model parameter value giving a virtual spectroscopic spectrum closest to the spectroscopic spectrum acquired at the spectroscopic spectrum measurement apparatus 1330. Also, a shape obtained by substituting the shape model parameter value into a shape model is output.

It is noted that the virtual shape data generation apparatus 1300, the optical simulator 1310, and the optical shape estimation apparatus 1320 are each similar in hardware configuration to the contour analysis apparatus 420 illustrated in FIG. 4B, and a similar description is omitted.

Figure 14:
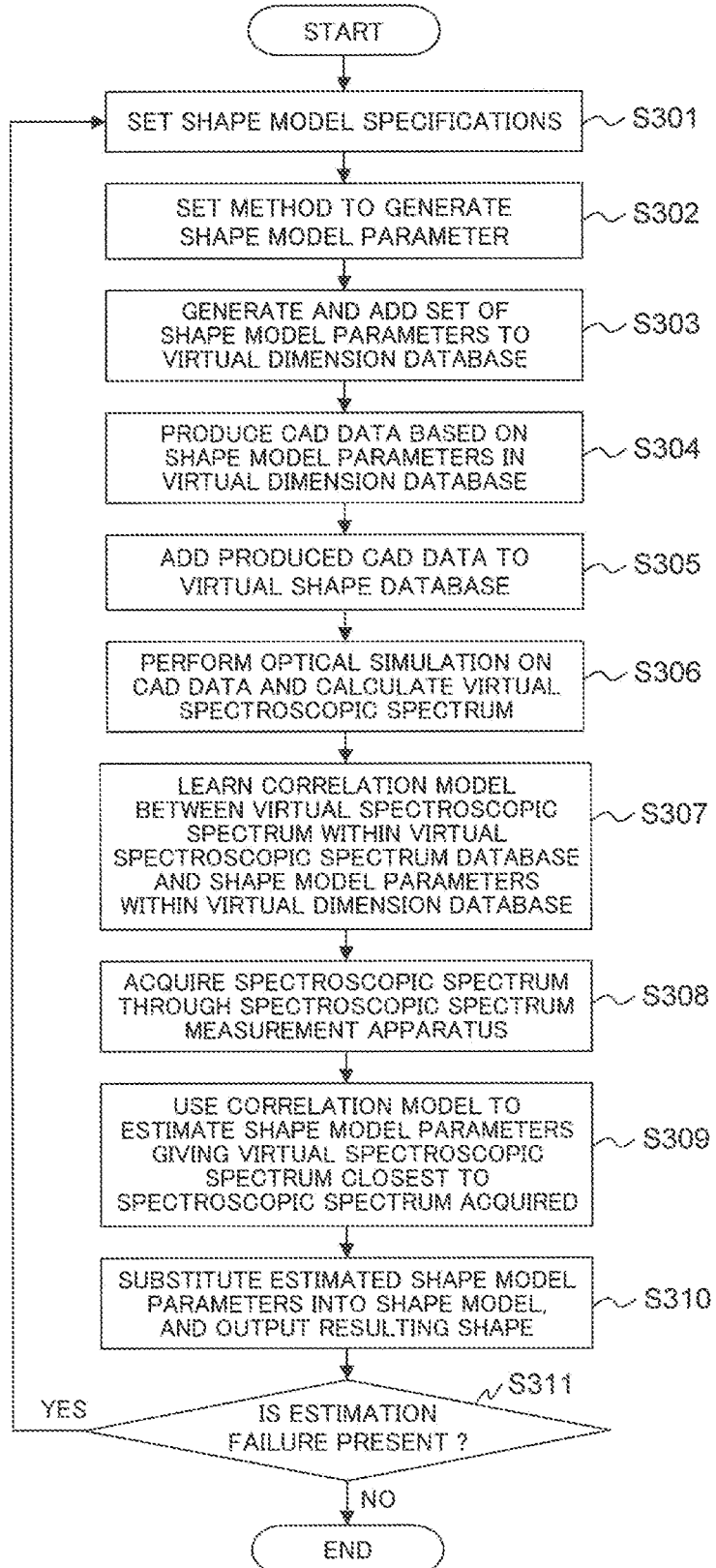
FIG. 14 is a flowchart of shape estimation in Example 3.

FIG. 14 is a flowchart when a structural shape estimation system illustrated in FIG. 13 estimates a shape from the spectroscopic spectrum measured by the spectroscopic spectrum measurement apparatus 1330. A method to estimate a shape is described below with reference to FIG. 14.

Shape model specifications are set through the shape model setting section 1301 (S301). For example, a model type may be specified such as "a line symmetric shape model composed of five ellipses", and/or a type of shape model parameters describing a shape model may be specified.

Then, a method to generate a set/sets of shape model parameter values is set through the generation method setting section 1302 (S302). For example, a range of shape model parameters may be specified and a plurality of values may be generated by dividing the range at regular intervals. The intervals are hereinafter referred to as increments. Here, the range and increments may be set in values varied from one type of shape model parameter to another. Alternatively, random numbers may be used for the generation.

Using the generation method set at the generation method setting section 1302, the parameter generation section 1303 generates a set/sets of shape model parameter values and stores the generated set/sets into the virtual dimension database 1304 (S303). The CAD section 1305 outputs, as CAD data, a virtual shape model obtained by substituting the shape model parameter values within the virtual dimension database 1304 into a shape model (S304).

The CAD section 1305 stores the generated CAD data (virtual shape model) into the virtual shape database 1306 (S305), and the optional simulator 1310 is used to calculate a virtual spectroscopic spectrum. The calculated virtual spectroscopic spectrum is stored in the virtual spectroscopic spectrum database 1321 (S306). The learning section 1322 learns a correlation model between the virtual spectroscopic spectrum within the virtual spectroscopic spectrum database 1321 and the shape model parameters within the virtual dimension database 1304 (S307). In this connection, the correlation model represents a regression or classification model, and a model using a kernel method, a model using a neural network, a model using decision tree, and the like are used.

The spectroscopic spectrum measurement apparatus 1330 is used for a semiconductor sample to acquire a spectroscopic spectrum (S308). The shape estimation section 1323 uses the correlation model learned by the learning section 1322 to estimate a shape model parameter giving a virtual spectroscopic spectrum closest to the acquired spectroscopic spectrum (S309). In this connection, a distance for evaluating the degree of closeness between values is calculated using any one of Euclidean distance, Manhattan distance, Chebyshev distance, and Mahalanobis distance.

Subsequently, the shape estimation section 1323 substitutes the estimated shape model parameter into a shape model and outputs the obtained shape (S310). The shape will be hereinafter referred to as an "estimated shape". It is determined whether or not a failure related to the estimated shape is present (S311), and if a failure is detected, the procedure returns to step S301 to perform reset of shape model specifications and reset for a method to generate shape model parameters. In this connection, failures related to the estimated shape may occur when the estimated shape model parameter value falls outside the range of shape model parameters set at the generation method setting section 1302, when a loss occurs in the estimated shape, and the like. If no failure is detected in step S311, the procedure is terminated.

Example 4

Figure 15:
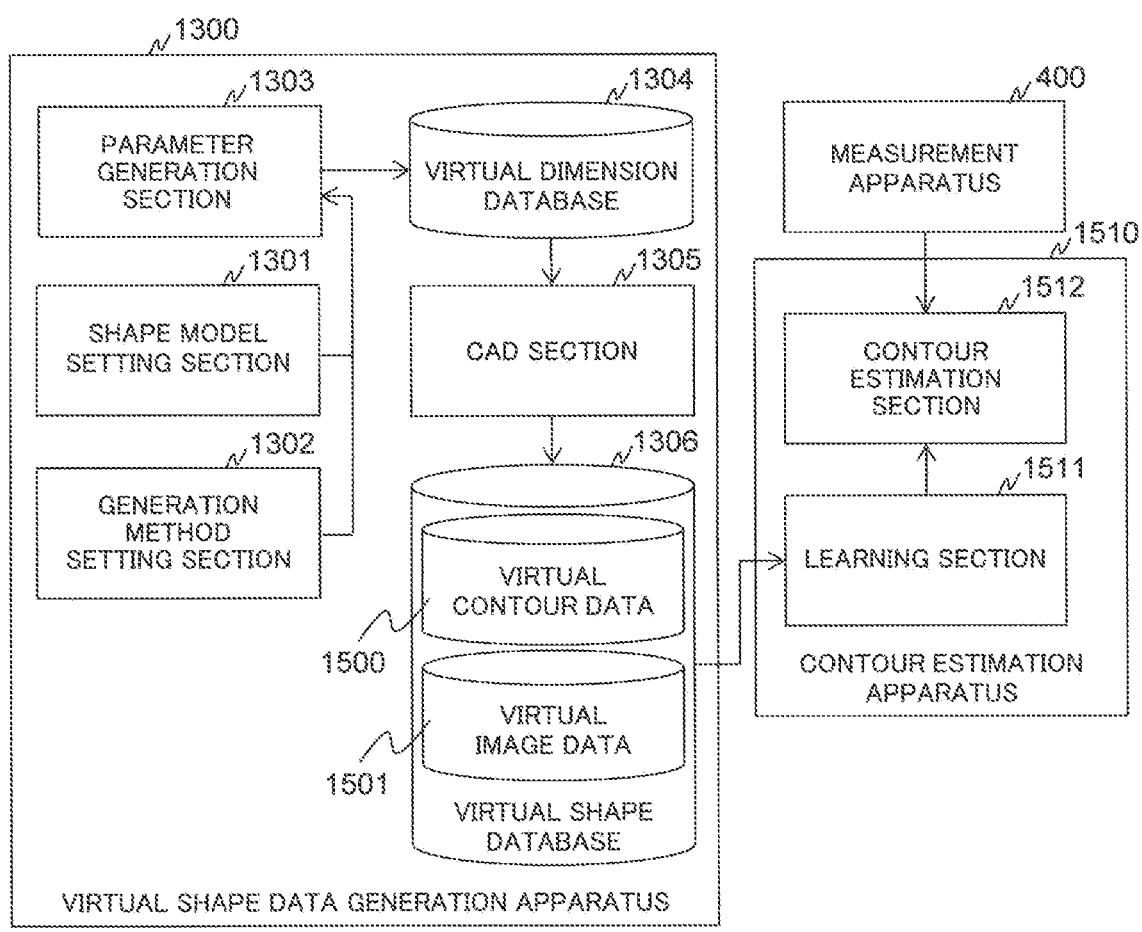
FIG. 15 is an example configuration of a contour detection system according to Example 4.

FIG. 15 is diagram illustrating an example configuration of a contour detection system according to Example 4. In Example 4, contours in an image such as SEM image or the like acquired by a test apparatus are detected.

Example 4 is directed to an increase in accuracy of the detection of a contour from an image acquired by the test apparatus. In particular, the detection accuracy in a detection method using machine learning is greatly dependent on quality and quantity of learning data on images and contours. In this example, a shape model using multiple ellipses is used to generate various shapes and contours thereof in order to achieve increased accuracy of contour detection.

Here, the measurement apparatus 400 is defined identically with that in Example 1 and the virtual shape data generation apparatus 1300 is defined identically with that in Example 3. It is noted that, in Example 4, CAD data generated by the CAD section 1305 includes virtual contour data 1500 and virtual image data 1501. The virtual contour data 1500 includes CAD data obtained by the CAD section 1305 converted from the contour of the intended structure derived from the shape model. The virtual image data 1501 includes CAD data that simulate an image actually acquired by the measurement apparatus 400, the CAD data being obtained by the CAD section 1305 making corrections to the shape derived from the shape model for color, color tones, brightness, the amount of noise, scaling, screen size, and the like.

The contour estimation apparatus 1510 is an apparatus that detects contour data from the image data received from the measurement apparatus 400, based on the virtual shape database 1306 of the virtual shape data generation apparatus 1300. The contour estimation apparatus 1510 has a learning section 1511 and a contour estimation section 1512. It is noted that the contour estimation apparatus 1510 is identical in hardware configuration with the contour analysis apparatus 420 illustrated in FIG. 4B, and a similar description is omitted.

The learning section 1511 learns a correlation model between the virtual image data and the virtual contour data 1500 within the virtual shape database 1306. The contour estimation section 1512 uses the correlation model obtained at the learning section 1511 to estimate the virtual contour data 1500 giving virtual image data 1501 closest to the image acquired at the measurement apparatus 400. Also, the resulting virtual contour data is output.

Figure 16:
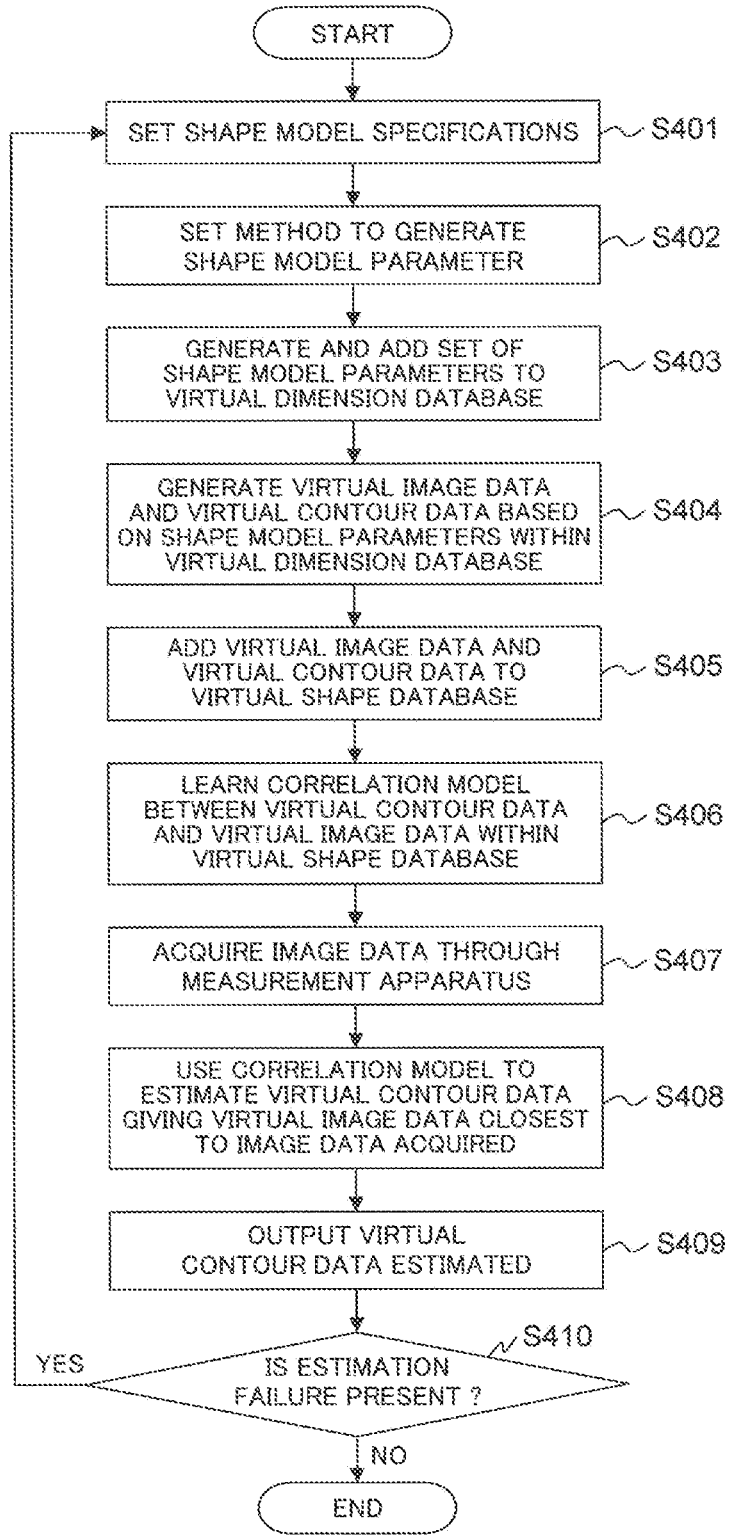
FIG. 16 is a flowchart of contour detection in Example 4.

FIG. 16 is a flowchart when the contour detection system illustrated in FIG. 15 detects contours from the image data measured and acquired at the measurement apparatus 400. A contour detection method will be described below with reference to FIG. 16.

The procedure steps S401 to S403 in FIG. 16 are identical with the procedure steps S301 to S303 in FIG. 14, respectively, and a description thereof is omitted. The CAD section 1305 converts, into CAD data, a shape obtained by substituting the shape model parameter values within the virtual dimension database 1304 into a shape model, and outputs the virtual image data 1501 and the virtual contour data 1500 (S404). The CAD data is stored into the virtual shape database 1306 (S405). The learning section 1511 learns a correlation model between the virtual contour data 1500 and the virtual image data 1501 within the virtual shape database 1306 (S406). In this connection, the correlation model represents a regression or classification model, and a model using a kernel method, a model using a neural network, a model using decision tree, and the like are used.

Subsequently, at the measurement apparatus 400, image data such as SEM images and/or the like is acquired (S407). The contour estimation section 1512 uses the correlation model obtained at the learning section 1511 to estimate the virtual contour data giving virtual image data closest to the acquired image data (S408). In this connection, a distance for evaluating the degree of closeness between images is obtained by calculating any one of Euclidean distance, Manhattan distance, Chebyshev distance, and Mahalanobis distance with respect to numeric values indicating color, color tone and brightness in each pixel. Then, the contour estimation section 1512 outputs the estimated virtual contour data (S409). It is determined whether or not a failure related to the estimated virtual contour data is present (S410), and if a failure is detected, the procedure returns to step S401 to perform reset of shape model specifications and reset for a method to generate shape model parameters. In this connection, failures related to the estimated virtual contour data may occur when the shape model parameter value giving the virtual contour data falls outside the range of shape model parameters set at the generation method setting section 1302, when a loss occurs in the virtual contour data, and the like. If no failure is detected in step S410, the procedure is terminated.

A GUI in accordance with Examples 3, 4 will be described below with reference to FIGS. 17 and 18.

Figure 17:
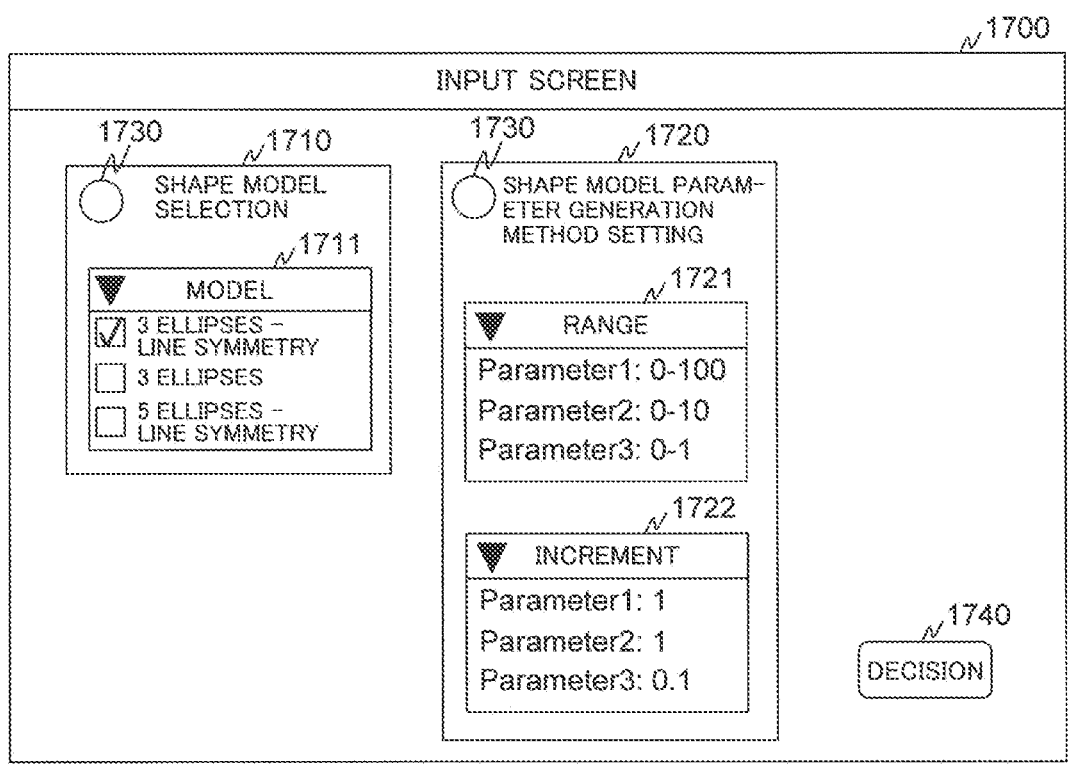
FIG. 17 illustrates an example of an input GUI.

The input GUI 1700 illustrated in FIG. 17 is an example input screen for input of settings of the virtual shape data generation apparatus 1300 according to Examples 3, 4. The input screen is provided before the procedure step S301 in the case of Example 3 and before the procedure step S401 in the case of Example 4.

The input GUI 1700 has a shape model selection box 1710, a shape model parameter generation method setting box 1720, an active/inactive display section 1730, and a decision button 1740. The shape model selection box 1710 and the shape model parameter generation method setting box 1720 are used to make settings for the shape model setting section 1301 and the generation method setting section 1302, respectively.

The shape model selection box 1710 has a model input section 1711. For example, selection is made from among a line symmetric shape model composed of a specific number of ellipses, a shape model without line symmetry assumption, and the like.

The shape model parameter generation method setting box 1720 has a range input section 1721 and an increment input section 1722. A range of shape model parameters is specified through the range input section 1721. The range may be specified to vary from one shape parameter to another. Increments into which the range input through the range input section 1721 is divided are specified through the increment input section 1722. In the example illustrated in FIG. 17, the ranges of Parameters 1, 2, 3 of the shape model parameters are divided into 100÷1=100, 10÷1=10, and 1÷0.1=10, respectively. Specifically, the shape model parameter values generated in this case result in Parameter 1=(0, 1, 2, ... 100), Parameter 2=(0, 1, 2, ... 10), Parameter 3=(0, 0.1, 0.2, ... 1), respectively.

The active/inactive display section 1730 of each of the abovementioned setting boxes displays whether or not each input described above is effectively provided. When all the active/inactive display sections 1730 become active, the decision button 1740 of the input GUI 1700 is pressed to start the procedure step S303 in the case of Example 3 and the procedure step S404 in the case of Example 4.

Figure 18:
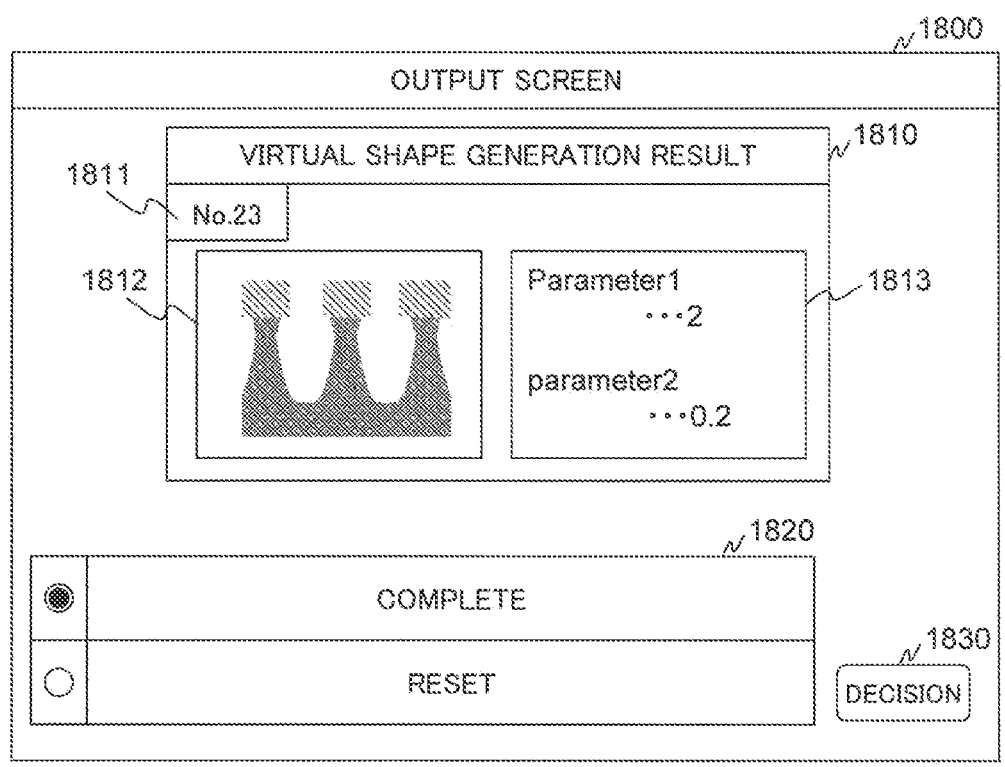
FIG. 18 illustrates an example of an output GUI.

FIG. 18 illustrates an output GUI 1800 presented in step S304 in the case of Example 3 and step S404 in the case of Example 4 after the decision button 1740 of the input GUI 1700 is pressed to execute the procedure in FIG. 14 or FIG. 16. The GUI displays a current status to allow the user to select whether to move to the subsequent procedure. A virtual shape generation result display section 1810 has a virtual shape data number display section 1811, a CAD data display section 1812, a shape model parameter display section 1813 and a complete/reset selection section 1820.

The virtual shape data number display section 1811 displays serial numbers of the generated shape model parameters. The shape model parameter display section 1813 displays a set/sets of shape model parameters with the serial numbers displayed on the virtual shape data number display section 1811. That is, in the example in FIG. 18, the $23^{rd}$ generated set of shape model parameters is displayed. The CAD data display section 1812 displays CAD data generated based on the set/sets of shape model parameters by the CAD section 1305.

Based on the virtual shape information displayed in the virtual shape generation result display section 1810, the user may select between the complete and the reset in the complete/reset selection section 1820. If the user determines that no failure occurs in the CAD data and the shape model parameters, the complete is selected and then the decision button 1830 is pressed in order to move to the procedure step S305 in the case of Example 3 and the procedure step S405 in the case of Example 4. If it is determined that a failure is present, the reset is selected and then the decision button 1830 is pressed in order to return back to the screen of the input GUI 1700, thereby enabling the reset.

A semiconductor device manufacturing system may be considered as an implementation of Examples 1 to 4 which have been described, which executes an application on a platform for operations management of lines including the semiconductor processing apparatus and the measurement apparatus. In this case, Examples 1 to 4 can be carried out in the semiconductor device manufacturing system by causing the contour detection apparatus 410, the contour analysis apparatus 420, the processing condition determination apparatus 900, the virtual shape data generation apparatus 1300, the optical shape estimation apparatus 1320, and the contour estimation apparatus 1510 to perform the respective processing as the applications on the platforms.

REFERENCE SIGNS LIST

100 ... ellipse,
110 ... starting point,
111 ... endpoint,
120 ... shape model,
130 ... center coordinates,
131 ... minor axis length,
132 ... major axis length,
133 ... minor axis tilt,
200 ... mask,
201 ... etched film,
210 ... maximum width,
211 ... depth,
212 ... bottom width,
213 ... top width,
214 ... midway width, 215 . . . taper angle,
216 . . . bow angle,
217 . . . bottom eccentricity,
400 . . . measurement apparatus,
410 . . . contour detection apparatus,
420 . . . contour analysis apparatus,
421 . . . analysis section,
422 . . . shape model database,
423 . . . shape model setting section,
424 . . . shape model fitting setting section,
425 . . . dimension extraction setting section,
426 . . . dimension calculation method setting section,
600 . . . contour,
601, 602 . . . shape model,
603 . . . likely shape model,
604 . . . ellipse,
700 . . . likely maximum width,
701 . . . likely depth,
702 . . . likely bottom width,
703 . . . likely bottom eccentricity,
900 . . . processing condition determination apparatus,
901 . . . processing condition database,
902 . . . learning section,
903 . . . processing condition estimation section,
904 . . . target dimension value setting section,
910 . . . semiconductor processing apparatus,
1100 . . . input GUI,
1110 . . . contour detection setting box,
1111 . . . detection method input section,
1112 . . . image input section,
1120 . . . shape model selection box,
1121 . . . model input section,
1130 . . . fitting setting box,
1131 . . . fitting method input section,
1140 . . . dimension extraction setting box,
1141 . . . dimension input section,
1150 . . . calculation method setting box,
1151 . . . calculation method input section,
1160 . . . active/inactive display section,
1170 . . . decision button,
1200 . . . output GUI,
1210 . . . dimension extraction result display section,
1211 . . . likely shape model display section,
1212 . . . dimension calculation result display section,
1220 . . . complete/reset selection section,
1230 . . . decision button,
1300 . . . virtual shape data generation apparatus,
1301 . . . shape model setting section,
1302 . . . generation method setting section,
1303 . . . parameter generation section,
1304 . . . virtual dimension database,
1305 . . . CAD section,
1306 . . . virtual shape database,
1310 . . . optical simulator,
1320 . . . optical shape estimation apparatus,
1321 . . . virtual spectroscopic spectrum database,
1322 . . . learning section,
1323 . . . shape estimation section,
1330 . . . spectroscopic spectrum measurement apparatus,
1500 . . . virtual contour data,
1501 . . . virtual image data,
1510 . . . contour estimation apparatus,
1511 . . . learning section,
1512 . . . contour estimation section,
1700 . . . input GUI,
1710 . . . shape model selection box,
1711 . . . model input section,
1720 . . . shape model parameter generation method setting box,
1721 . . . range input section,
1722 . . . increment input section,
1730 . . . active/inactive display section,
1740 . . . decision button,
1800 . . . output GUI,
1810 . . . virtual shape generation result display section,
1811 . . . virtual shape data number display section,
1812 . . . CAD data display section,
1813 . . . shape model parameter display section,
1820 . . . complete/reset selection section,
1830 . . . decision button.

The invention claimed is:

1. A contour analysis apparatus that analyzes contour data on an intended structure which is detected from image data on a semiconductor sample acquired by a measurement apparatus using a charged particle beam apparatus, comprising:
a shape model setting section that sets shape model specifications which are specifications of a shape model which is a curve of a unicursal drawn on a periphery of a graphic shape including a combination of multiple ellipses;
a shape model fitting setting section that sets a fitting method for a shape model;
an analysis section that obtains a likely shape model of the contour data by fitting a shape model of the shape model specifications into the contour data by a fitting method set at the shape model fitting setting section; and
a shape model database that stores values of shape model parameters of the likely shape model.

2. The contour analysis apparatus according to claim 1, further comprising:
a dimension extraction setting section that sets a dimension of interest to be extracted from the contour data; and
a dimension calculation method setting section that sets a calculation method to calculate the dimension of interest to be extracted which is set at the dimension extraction setting section,
wherein the analysis section uses the likely shape model to calculate a value of the dimension of interest to be extracted which is set at the dimension extraction setting section, by the calculation method set at the dimension calculation method setting section.

3. The contour analysis apparatus according to claim 2, wherein the dimension extraction setting section is capable of setting a singularity search method to search for a singularity on the shape model and calculate, from coordinates of the singularity, a dimension of interest to be extracted that is set at the dimension extraction setting section,
as the singularity, an extreme value point at which a differential value in the shape model becomes zero, an indifferentiable point, an inflection point at which a differential value changes from positive to negative are included.

4. The contour analysis apparatus according to claim 1, wherein shape model parameters of the shape model include parameters related to shapes and arrangement of the ellipses forming the graphic shape, and parameters related to how to draw the unicursal.

5. The contour analysis apparatus according to claim 1, wherein the shape model fitting setting section is configured to able to select from among a least squares method, a weighted least squares method, and a normalized least squares method in order to perform fitting, and to able to select from between nonlinear optimization approach using an iterative solution technique and combinatorial optimization approach in order to obtain shape model parameters of the likely shape model.

6. A processing condition determination system, comprising:
the contour analysis apparatus according to claim 1; and
a processing condition determination apparatus that determines processing conditions of a semiconductor processing apparatus,
wherein the semiconductor sample is a semiconductor sample processed by the semiconductor processing apparatus, and
the processing condition determination apparatus has
a learning section that learns a correlation model between processing conditions of the semiconductor processing apparatus and values of shape model parameters of a likely shape model of contour data on an intended structure detected from image data on the semiconductor sample processed in the processing conditions by the semiconductor processing apparatus,
a target dimension value setting section that sets a target value of a shape model parameter of the likely shape model, and
a processing condition estimation section that uses the correlation model to estimate processing conditions of the semiconductor processing apparatus giving the target value of the shape model parameter of the likely shape model set at the target dimension value setting section.

7. A shape estimation system, comprising:
a virtual shape data generation apparatus that creates virtual shape data related to intended structure of a semiconductor sample; and
a shape estimation apparatus that estimates a shape of intended structure from data on a semiconductor sample acquired by a measurement apparatus,
wherein the virtual shape data generation apparatus has
a shape model setting section that sets shape model specifications which are specifications of a shape model which is a curve of a unicursal drawn on a periphery of a graphic shape including a combination of multiple ellipses, the shape model describing a shape of the intended structure of the semiconductor sample,
a generation method setting section that sets a generation method to generate sets of values of shape model parameters for the shape model specifications set at the shape model setting section,
a parameter generation section that generates the sets of values of shape model parameters for the shape model specifications set at the shape model setting section by the generation method set at the generation method setting section, and
a CAD section that generates a virtual shape model of the intended structure based on a shape model resulting from substitution of any one of the sets of values of shape model parameters generated at the parameter generation section into the shape model specifications, and
the shape estimation apparatus has
a learning section that learns a correlation model between values of shape model parameters of a shape model used for generation of the virtual shape model of the intended structure, and virtual data which is expected to be obtained as data on the semiconductor sample acquired by the measurement apparatus with respect to the virtual shape model of the intended structure, and
a shape estimation section that uses the correlation model to estimate values of shape model parameters giving virtual data closest to data on the semiconductor sample acquired by the measurement apparatus.

8. The shape estimation system according to claim 7,
wherein the measurement apparatus is a spectroscopic spectrum measurement apparatus,
further comprising an optical simulator that calculates a virtual spectroscopic spectrum which is a theoretical value of a spectroscopic spectrum obtained from the intended structure by Scatterometry, with respect to the virtual shape model of the intended structure,
wherein the learning section of the shape estimation apparatus uses the virtual spectroscopic spectrum calculated by the optical simulator as the virtual data.

9. A shape estimation system, comprising:
a virtual shape data generation apparatus that creates virtual shape data related to intended structure of a semiconductor sample; and
a shape estimation apparatus that estimates a shape of intended structure from data on a semiconductor sample acquired by a measurement apparatus,
wherein the virtual shape data generation apparatus has
a shape model setting section that sets shape model specifications which are specifications of a shape model which is a curve of a unicursal drawn on a periphery of a graphic shape including a combination of multiple ellipses, the shape model describing a shape of the intended structure of the semiconductor sample,
a generation method setting section that sets a generation method to generate sets of values of shape model parameters for the shape model specifications set at the shape model setting section,
a parameter generation section that generates sets of values of shape model parameters for the shape model specifications set at the shape model setting section by the generation method set at the generation method setting section, and
a CAD section that generates, based on a shape model resulting from substitution of any one of the sets of values of shape model parameters generated at the parameter generation section into the shape model specifications, first virtual data obtained by simulating data on the semiconductor sample expected to be acquired by the measurement apparatus, and second virtual data about a shape of the intended structure expected from the shape model, and
the shape estimation apparatus has
a learning section that learns a correlation model between the first virtual data and the second virtual data that are generated at the CAD section, and
a shape estimation section that uses the correlation model to estimate the second virtual data giving the first virtual data closest to data acquired on the semiconductor sample by the measurement apparatus.

10. The shape estimation system according to claim 9,
wherein the measurement apparatus is a measurement apparatus using a charged particle beam apparatus,
the data on the semiconductor sample acquired by the measurement apparatus is image data on the intended structure, and
a contour of the intended structure is estimated as the shape of the intended structure.

11. A semiconductor device manufacturing system, comprising:
- a semiconductor processing apparatus; and
- a platform on which dimension measurement processing is executed to measure dimensions of a measurement object processed by the semiconductor processing apparatus using an image, the platform being connected to the semiconductor processing apparatus through a network, wherein the dimension measurement processing has
- a step of setting shape model specifications which are specifications of a shape model which is a curve of a unicursal drawn on a periphery of a graphic shape including a combination of multiple ellipses,
- a step of setting a fitting method for a shape model;
- a step of obtaining a likely shape model of the contour data by fitting a shape model of the shape model specifications into the contour data on the measurement object by the set fitting method,
- a step of storing values of shape model parameters of the likely shape model,
- a step of setting a dimension of interest to be extracted from the contour data,
- a step of setting a calculation method of calculating the set dimension of interest to be extracted, and
- a step of using the likely shape model to calculate a value of the set dimension of interest to be extracted by the set calculation method.

12. The semiconductor device manufacturing system according to claim 11,
wherein the dimension measurement processing is executed as an application installed on the platform.

13. A search apparatus in which input parameter values are retrieved to obtain a target processing shape in a semiconductor processing apparatus,
wherein the input parameter values are retrieved by an estimation model resulting from obtaining, as learning data, dimension data measured based on a contour of a shape estimated using a shape function,
wherein the shape function is a function using multiple ellipses.

* * * * *